March 17, 1970   M. L. MILLER ET AL   3,501,771
ROOT MEAN SQUARE VOLTAGE REGULATOR
Filed Feb. 19, 1968
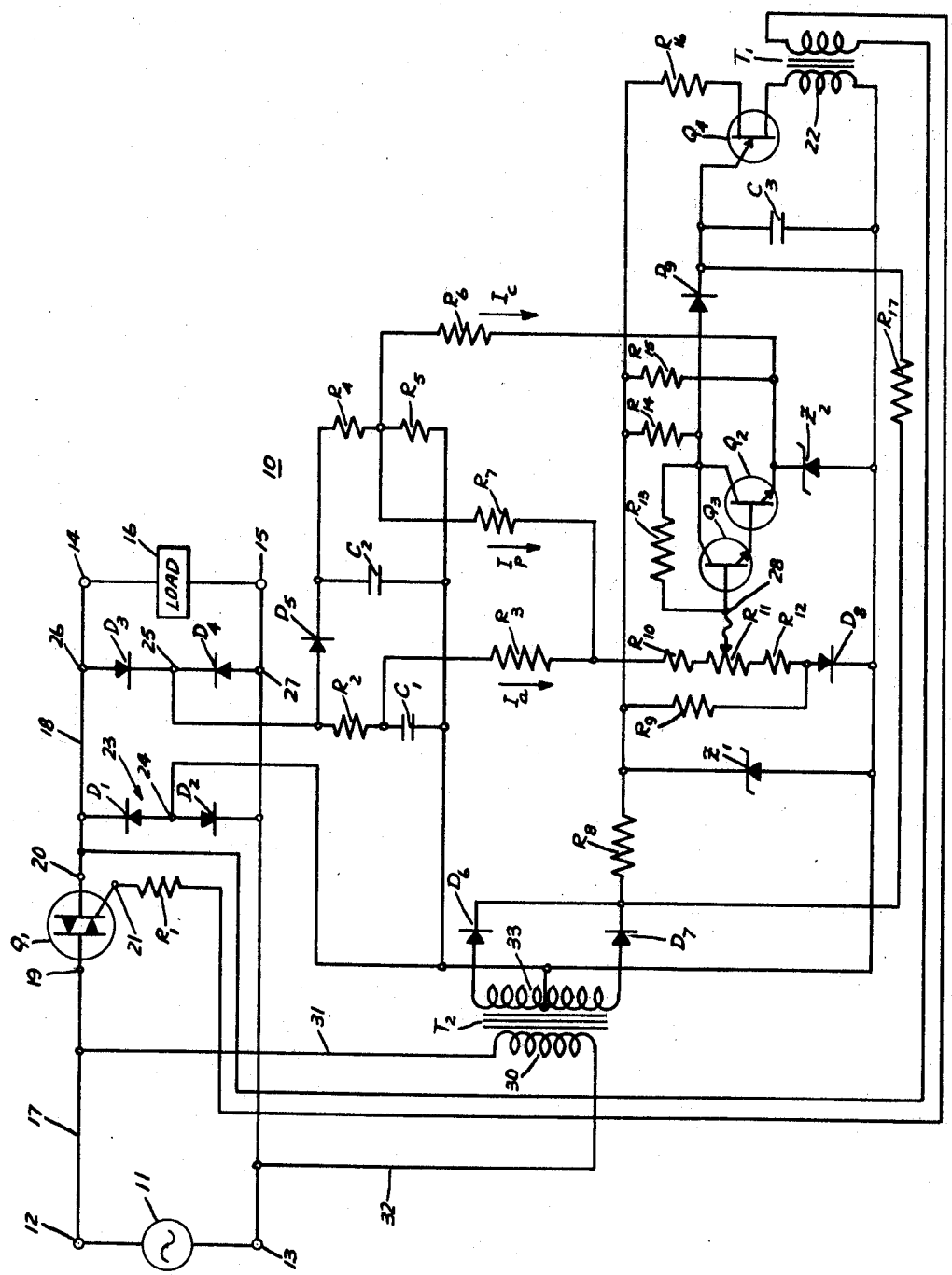
INVENTORS:
Meritt L. Miller,
Lambert L. Johnson,
BY
Attorney.

United States Patent Office 3,501,771
Patented Mar. 17, 1970

3,501,771
ROOT MEAN SQUARE VOLTAGE REGULATOR
Meritt L. Miller and Lambert L. Johnson, Fort Wayne, Ind., assignors to General Electric Company, a corporation of New York
Filed Feb. 19, 1968, Ser. No. 706,373
Int. Cl. G05f 1/32
U.S. Cl. 323—22        10 Claims

ABSTRACT OF THE DISCLOSURE

A regulating power supply circuit in which the power supplied at the output is controlled by phase controlling a semiconductor switching device in response to changes in a hybrid signal indicative of the root mean square value of the output voltage. The hybrid signal is formed by combining a first signal representing the average value of the output load voltage and a second signal representing the peak value of the load voltage. The two signals are currents of relatively small magnitude, and suitably proportioned amounts of the two currents are fed into the summing junction of an operational amplifier. Preferably, a circuit branch is provided for diverting a portion of the second signal current when the peak value of the load voltage exceeds a preselected value. A correction is thereby applied to compensate for the error inherent in approximating a root mean square value from peak and average values.

BACKGROUND OF THE INVENTION

This invention relates to circuitry for controlling the root mean square magnitude of an electrical parameter. More particularly, the invention relates to such circuits wherein the root mean square magnitude of the voltage applied to a load is regulated and to such circuits that are readily adapted for use with bidirectional current conducting semiconductor devices.

In certain applications it is desirable to supply power to a load in response to changes in the root mean square magnitude of an electrical parameter, such as the load voltage. Although permanent magnet moving-coil, moving-iron and thermocouple type of instruments can provide indications of the root mean square magnitude of an electrical parameter, such devices have not found any widespread use in regulated power supply circuit applications.

Permanent magnet moving-coil and moving-iron type of instruments are not readily adapted to circuitry for triggering semiconductor switching devices and use moving parts. Thermocouple type of sensing devices are temperature sensitive and fragile. The use of such devices would not only increase the complexity of the triggering circuitry, but it would also present a problem from a standpoint of reliability.

Accordingly, it is a general object of the present invention to provide an improved root mean square regulator.

It is a more specific object of the present invention to provide an improved root mean square regulator that is readily adaptable for use in conjunction with semiconductor switching devices for controlling the power supplied to a load.

Another object of the present invention is to provide an improved root mean square voltage regulator that is characterized by low cost and high reliability.

SUMMARY OF THE INVENTION

In accordance with one form of our invention, we have provided an improved root mean square voltage regulator that includes a semiconductor switching means for controlling the interval of conduction of current from an alternating current source to a load during each half cycle. The regulator includes an output means for connection to the load and an input means for connection with the alternating current supply. The semiconductor switching means is connected in circuit with the input and output means for symmetrically energizing the output means in each half cycle of the alternating current supply.

Further, the regulator includes a bridge rectifier with its A.C. terminals connected across the output means and its D.C. terminals coupled with a circuit branch for supplying a first signal indicative of the average value of the output voltage and with a circuit for supplying a second signal indicative of the peak value of the output voltage. The regulator includes circuit means for coupling the first and second signals to a summing means to provide a hybrid signal indicative of the magnitude of the root mean square magnitude of the output voltage. A phase control firing circuit is coupled with the summing means and the semiconductor switching means to trigger the semiconductor switching means at a particular phase angle responsive to changes in the magnitude of the hybrid signal thereby to maintain the root mean square magnitude of the output voltage substantially at a preselected level.

According to a more specific aspect of our invention, for achieving a relatively more accurate approximation of the root mean square value of the load voltage, we have included in the sensing circuit a branch for diverting a portion of the second signal current when the magnitude of the peak load voltage exceeds a certain value. Also, preferably, the sensing circuit may include a means for proportioning the relative magnitude of the first and second signals so that only preselected portions of the first and second signals are applied to the summing means.

An important advantage of the improved root mean square voltage regulator, as compared to magnetic stabilizers, is that it is relatively less expensive and smaller in size and weight.

The invention is set forth with particularity in the appended claims. The invention itself, however, both as to its organization and method of operation together with further objects and features thereof, may best be understood by reference to the following description taken in conjunction with the accompanying drawing wherein:

BRIEF DESCRIPTION OF THE DRAWING

The figure is a schematic circuit diagram of an illustrative embodiment of a circuit constructed in accordance with the invention and employing a bidirectional current conducting semiconductor device.

DESCRIPTION OF THE PREFERRED EMBODIMENT

Having more specific reference to the drawing, we will now more fully describe the illustrated embodiment of our invention which is generally identified by the reference numeral 10. The root mean square regulator 10 is adapted for connection to an alternating voltage source 11 by means of a pair of input terminals 12, 13. Depending upon the specific load requirements, the alternating current source 11 may be a commercial power supply where the load can tolerate variations in the input voltage or may be the secondary of a voltage stabilizing transformer where the particular load cannot tolerate a substantial drop in the input voltage.

A root means square regulated output voltage is supplied across a pair of output terminals 14, 15 to a load 16. For the purpose of controlling the power supplied to the load 16, a semiconductor switching device $Q_1$ is connected in circuit by leads 17, 18 to input terminal 12 and output terminal 14. When the semiconductor switching device is triggered into conduction at a selected phase angle in each half cycle of the alternating supply, the load 16 will be energized for a preselected interval in each half cycle.

The semiconductor switching device $Q_1$, used in the illustrated embodiment of the invention, is a bidirectional current-carrying semiconductor commonly referred to as a triac. It includes a pair of current-carrying leads 19 and 20 with a gate terminal 21. The semiconductor structure of this device is shown and described in Patent No. 3,275,909 issued on Sept. 27, 1967, to F. W. Gutzwiller and assigned to the same assignee as the present application. In general, such bidirectional current-carrying semiconductors can be switched to the low impedance state in either direction of conduction by applying triggering impulses at the gate terminal 21. The gate terminal 21 is coupled with the secondary winding 22 of a pulse transformer $T_1$ through a resistor $R_1$. The resistor $R_1$ is used to prevent pulses generated in the semiconductor switching device $Q_1$ from feeding back into the firing circuit and interfering with its function. In either half cycle of the alternating current supply, the semiconductor switching device $Q_1$ is switchable to a low impedance state by the application of a current signal into the gate terminal 21.

A full wave bridge rectifier consisting of the diodes $D_1$, $D_2$, $D_3$, and $D_4$ provides a rectified D.C. signal across its D.C. terminals 24, 25, the A.C. terminals 26, 27 being connected in circuit with the output terminals 14, 15 of the root mean square voltage regulator 10. The D.C. output of the bridge rectifier 23 is applied across a serially connected resistor $R_2$ and a capacitor $C_1$. Ideally, the charge and discharge time constants of the capacitor $C_1$ should be the same so that the voltage appearing on the capacitor $C_1$ is substantially proportional to the average value of the load voltage.

The D.C. output of bridge rectifier 23 is also applied through a diode $D_5$ to a capacitor $C_2$. In each half cycle the capacitor $C_2$ is charged to the peak voltage of the rectified waveform. This peak voltage is divided down by the resistors $R_4$ and $R_5$.

Preferably, to correct the errors inherent in approximating a root mean square signal from the peak and average value of a chopped waveform, a circuit branch including a resistor $R_6$ is provided. One end of the resistor $R_6$ is connected to the voltage divider junction between the resistors $R_4$ and $R_5$. The other end is connected to the Zener diode $Z_2$ which supplies the required bias for resistor $R_6$ to provided the desired nonlinear corrections of the peak voltage.

In the illustrated embodiment of the invention, when the peak voltage exceeded 6.2 volts, an appreciable amount of current starts to flow through the resistor $R_6$. It was found that this current flow causes the peak component of the sensing signal to be nonlinear in such a manner that the error resulting from combining peak and average values to synthesize a signal representing a root mean square value was essentially corrected.

It will be seen that the current signals flowing through the resistors $R_3$, $R_7$, $R_6$ are identified schematically in the drawing by the symbols $I_a$ representing the current indicative of the average value of the load voltage, $I_p$ representing the current indicative of the peak value of the load voltage, and $I_c$ representing the correction current, both of which are diverted from the junction of resistors $R_4$ and $R_5$.

A center tapped transformer $T_2$ including diodes $D_6$ and $D_7$ supplies the power for the triggering circuit coupled with the triac $Q_1$ and also properly synchronizes the triggering circuit with the alternatng current supply. It will be noted that the primary winding 30 of transformer $T_2$ is connected by leads 31, 32 across the alternating source 11. The output appearing across the center tapped secondary winding 33 is passed through a resistor $R_8$ and applied across the cathode-to-anode path of a Zener diode $Z_1$. The resultant voltages appearing across the Zener diodes $Z_1$ and $Z_2$ function as a supply voltage for the triac triggering circuit. A resistor $R_9$ controls the proper amount of current flow through a diode $D_8$, which provides temperature compensation such that the temperature coefficient of Zener diode $Z_2$ and diode $D_8$ essentially matches the temperature coefficients of the transistors $Q_2$ and $Q_3$. The purpose of the resistors $R_{10}$, $R_{11}$ and $R_{12}$ is to apply a proportional part of the combined currents $I_a$ and $I_p$ at the summing junction of the operational amplifier comprised of transistors $Q_2$, $Q_3$ and resistors $R_{13}$, $R_{14}$.

The triggering circuit for the triac $Q_1$ includes the unijunction transistor $Q_4$, pulse transformer $T_1$, diode $D_9$, capacitor $C_3$, and resistors $R_{15}$, $R_{16}$, and $R_{17}$. It is a ramp and pedestal type of firing circuit and is more fully described in the Silicon Controlled Rectifier Manual, third edition, copyright 1964, by the General Electric Company, at pages 131–133. Transistors $Q_2$ and $Q_3$ provide a pedestal whose height is determined by the compensating signal flowing through the branch which includes the resistor $R_6$. The cosine ramp is provided by the circuit branch which includes the resistor $R_{17}$ connected directly in circuit with the capacitor $C_3$. The rectifier $D_9$ isolates the voltage of the capacitor $C_3$ from the collectors of the transistors $Q_2$ and $Q_3$.

In order to aid those skilled in the art in the practice of the present invention, a root mean square regulator was constructed to provide a substantially constant 95 volt root mean square alternating current supply at 1.2 kilowatts. The following circuit components which are given by way of exemplification of one form of our invention were used:

Triac $Q_1$.—General Electric SC50B
Transistors $Q_2$, $Q_3$.—2N3859A
Unijunction transistor $Q_4$.—2N2646
Diodes $D_1$, $D_2$, $D_3$, $D_4$, $D_5$, $D_6$, $D_8$, $D_9$.—IN5059
Zener diodes:
    $Z_1$.—Motorola IN5242
    $Z_2$.—Motorola IN5234
Transformers:
    $T_1$.—Sprague 112300
    $T_2$.—General Electric 9T45Y2187, 120 volt, 42 volt center tapped
Capacitors:
    $C_1$.—0.22 microfarad, 100 volts
    $C_2$.—0.22 microfarad, 200 volts
    $C_3$.—0.1 microfarad, 100 volts
Resistors:
    $R_1$.—33 ohms
    $R_2$, $R_3$.—470,000 ohms
    $R_4$.—820,000 ohms
    $R_5$.—68,000 ohms
    $R_6$.—750,000 ohms
    $R_7$.—330,000 ohms
    $R_8$.—470,000 ohms
    $R_9$.—10,000 ohms
    $R_{10}$.—39,000 ohms
    $R_{11}$.—10,000 ohm variable resistor
    $R_{12}$.—36,000 ohms
    $R_{13}$.—27,000 ohms
    $R_{14}$.—5,600 ohms
    $R_{15}$.—18,000 ohms
    $R_{16}$.—470 ohms
    $R_{17}$.—680,000 ohms Having reference now again to the drawing, we will now more fully describe the operation of the root mean square regulator. During the "on" condition of the regulator, the timing capacitor $C_3$ of the firing circuit reaches the peak point voltage of the unijunction transistor $Q_4$ in each half cycle, and the triac $Q_1$ is turned on to energize the load 16. Let us assume that the magnitude of the root mean square value of the load voltage falls below a preselected level. This is reflected in a decrease of the voltage which appears across the D.C. terminals 24, 25 of the bridge rectifier 23. The magnitude of the current $I_a$ and and the current $I_p$ will now accordingly change.

A fractional part of the combined currents $I_a$ and $I_p$ will now flow into the summing junction 28 of the operational amplifier consisting of $Q_2$ and $Q_3$ and $R_{13}$ and $R_{14}$. The output of the amplifier should now provide an approximate signal proportional to the root mean square voltage applied across the load to produce a change in the pedestal height. The capacitor $C_3$ will be charged to its peak point voltage at an earlier point in the half cycle resulting in a change in the phase angle of firing of the unijunction transistor $Q_4$. A pulse will be applied to the gate terminal 21 of the triac $Q_1$ at an earlier point in each half cycle thereby to correct the root mean square value of the output voltage.

From the foregoing description of the root mean square regulator, it will be apparent that an improved arrangement has been provided for sensing the root mean square magnitude of the load voltage. With the improved sensing arrangement, it is possible to provide a regulator having an output stabilized to within plus or minus one percent that is relatively inexpensive to manufacture and relatively smaller in size and weight than a comparable magnetic stabilizer.

Although in the illustrated embodiment of our invention, the root mean square value of the load voltage was the selected parameter sensed, it will be appreciated that our improved sensing arrangement is readily adapted for sensing the root mean square values of other electrical parameters such as current and power.

It will be understood therefore that the embodiment of our invention described herein is intended as illustrative of the invention and that the invention is not limited to any such embodiment. It will be appreciated that many modifications may be made by those skilled in the art without actually departing from the invention. We intend, therefore, to cover all such modifications that fall within the true spirit and scope of the invention.

What we claim as new and desire to secure by Letters Patent of the United States is:

1. A root mean square voltage regulator for controlling in each half cycle the output voltage supplied to a load, said regulator comprising: semiconductor switching means switchable bilaterally between a low impedance and a high impedance condition in each half cycle; circuit means for energization from an alternating supply and connecting said switching means in circuit with an output means for supplying the output voltage to the load; a sensing circuit including rectifying means connected in circuit with said semiconductor switching means and said output means, circuit means coupled with said rectifying means for supplying a first direct current signal indicative of the average value of the output voltage, circuit means coupled with said rectifying means for supplying a second direct current signal indicative of the peak value of the output voltage, and summing means for combining at least portions of said first and second signals to synthesize a hybrid signal indicative of the root means square magnitude of the output voltage signal; and means coupled with said summing means and semiconductor switching means for triggering said semiconductor switching means in response to changes in said hybrid signal thereby to maintain the root mean square magnitude of the output voltage substantially at a preselected level.

2. The root mean square voltage regulator as set forth in claim 1 wherein said semiconductor switching means is a bidirectional current-carrying semiconductor.

3. The root mean square voltage regulator set forth in claim 1 wherein said sensing circuit further includes a means for diverting a portion of said second signal when the peak voltage supplied to the load exceeds a predetermined value thereby to correct for the error inherent in approximating a root mean square value by combining the peak and average values thereof.

4. The root mean square voltage regulator set forth in claim 1 wherein said sensing circuit also includes a means for proportioning the relative magnitude of said first and second signals thereby to apply at said summing means preselected portions of said first and second signals.

5. The root mean square regulator set forth in claim 1 wherein said means for triggering said semiconductor switching means is a ramp and pedestal unijunction firing circuit and said semiconductor switching means is a triac.

6. A root mean square voltage regulator comprising: semiconductor switching means for controlling the interval of conduction of power from an alternating current source to a load during each half cycle, output means for connection to the load and for supplying thereto an output voltage, input means for connection with the alternating current source, circuit means connecting said semiconductor switching means in circuit with said input and output means for symmetrically energizing said output means in each half cycle of the alternating current supply, rectifying means having A.C. and D.C. terminals, said A.C. terminals being connected across said output means, means coupled with said D.C. terminals for supplying a first signal representative of the average value of the output voltage, means coupled with said D.C. terminals for supplying a second signal representative of the peak value of the output voltage, summing means for combining at least selected portions of said first and second signals to provide a hybrid signal indicative of the magnitude of the root means square magnitude of the output voltage, and firing circuit means coupled with said semiconductor switching means and said summing means for triggering said semiconductor switching means in response to changes in the magnitude of said hybrid signal thereby to regulate the root mean square value of the output voltage.

7. The voltage regulator set forth in claim 6 wherein said first and second signals are currents and means are included for diverting a portion of said second signal when the peak voltage at said output means exceeds a predetermined value thereby to correct for the error inherent in approximating a root mean square value by combining the peak and average values thereof.

8. The root mean square voltage regulator as set forth in claim 6 wherein said semiconductor switching means is a bidirectional current-carrying semiconductor.

9. The root mean square voltage regulator set forth in claim 6 wherein a means for proportioning the relative magnitude of said first and second signals is provided for applying at said summing means preselected portions of said first and second signals.

10. The root mean square voltage regulator set forth in claim 6 wherein said firing circuit means is a ramp and pedestal unijunction firing circuit and said semiconductor switching means is a triac.

References Cited

UNITED STATES PATENTS 3,244,964    4/1966    Greening et al.
3,409,821    11/1968    Bingley _____ 323—20

W. M. SHOOP, Jr., Primary Examiner

A. P. PELLINEN, Assistant Examiner

U.S. Cl. X.R.

307—297; 323—24, 34